US012650540B2

(12) United States Patent
Yokoyama et al.

(10) Patent No.: US 12,650,540 B2
(45) Date of Patent: Jun. 9, 2026

(54) OPTICAL APPARATUS, IMAGE PICKUP APPARATUS, AND PROJECTION APPARATUS

(71) Applicant: CANON KABUSHIKI KAISHA, Tokyo (JP)

(72) Inventors: Akira Yokoyama, Tochigi (JP); Shotaro Watanabe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 18/448,740

(22) Filed: Aug. 11, 2023

(65) Prior Publication Data

US 2024/0061154 A1     Feb. 22, 2024

(30) Foreign Application Priority Data

Aug. 16, 2022     (JP) ................................. 2022-129616

(51) Int. Cl.
| | |
|---|---|
| *G02B 1/113* | (2015.01) |
| *G02B 1/12* | (2006.01) |
| *G02B 7/02* | (2021.01) |
| *G02B 27/00* | (2006.01) |

(52) U.S. Cl.
CPC ................ *G02B 1/113* (2013.01); *G02B 1/12* (2013.01); *G02B 7/026* (2013.01); *G02B 27/0018* (2013.01)

(58) Field of Classification Search
CPC .......... G02B 7/02; G02B 7/021; G02B 7/022; G02B 7/023; G02B 7/025; G02B 7/026; G02B 1/113; G02B 1/11; G02B 1/118; G02B 1/12; G02B 5/0247; G02B 27/0018
See application file for complete search history.

(56) References Cited

U.S. PATENT DOCUMENTS

| | | | |
|---|---|---|---|
| 12,085,734 B1 * | 9/2024 | Maric | .................. G02B 25/001 |
| 2021/0003907 A1 * | 1/2021 | Kondo | .................... G02B 7/10 |
| 2021/0223500 A1 * | 7/2021 | Hirao | ................ G02B 13/0025 |
| 2021/0373277 A1 * | 12/2021 | Qiu | ........................ G02B 7/021 |

FOREIGN PATENT DOCUMENTS

| | | | |
|---|---|---|---|
| JP | 2005156989 A | 6/2005 | |
| JP | 2011118170 A * | 6/2011 | |
| JP | 2012002895 A * | 1/2012 | |
| JP | 2021056494 A | 4/2021 | |
| WO | WO-2016009734 A1 * | 1/2016 | ............... G02B 7/02 |

* cited by examiner

*Primary Examiner* — Ephrem Z Mebrahtu
(74) *Attorney, Agent, or Firm* — Canon U.S.A., Inc. IP Division

(57)     ABSTRACT

The optical apparatus comprises an optical member and an aluminum alloy member facing the optical member. A black oxide coating is formed on a surface of the aluminum alloy member facing the optical member, and a plurality of holes each having a diameter of 5 μm or more and 100 μm or less are formed in the black oxide coating.

13 Claims, 9 Drawing Sheets

OPTICAL APPARATUS, IMAGE PICKUP APPARATUS, AND PROJECTION APPARATUS

BACKGROUND

Field of the Disclosure

The present disclosure relates to an optical apparatus, an image pickup apparatus, and a projection apparatus.

Description of the Related Art

In general, an incident light on a lens apparatus passes through a plurality of lenses. When a part of the incident light is reflected by an inner surface of a component constituting the lens apparatus and stray light is generated, a phenomenon called flare or ghost that deteriorates the performance of the lens apparatus may occur.

Japanese Patent Application Laid-Open No. 2005-156989 discloses that a fine concave-convex structure (pitch 100 nm, hole diameter 50 nm) having an interval and a size smaller than wavelengths of visible light is formed of an aluminum anodized film on at least a part of an internal wall surface of a lens frame in order to suppress a ghost. Further, Japanese Patent Application Laid-Open No. 2021-56494 discloses a member comprising a first layer provided on a substrate made of an aluminum alloy, the first layer comprising a black porous aluminum oxide, and a second layer provided on the first layer, the second layer comprising an aluminum oxide having a plurality of protrusions.

However, in Japanese Patent Application Laid-Open No. 2005-156989, since a pore diameter of the fine concave-convex structure is small, the apparent pore diameter in a case where stray light having a large angle with respect to the normal line of the component surface is incident is further reduced, and the stray light is reflected without entering the pores, which is disadvantageous in reducing the stray light. The same can be said for the effect of reducing stray light in the porous first layer disclosed in Japanese Patent Application Laid-Open No. 2021-56494.

SUMMARY

An aspect of embodiments provides, for example, an optical apparatus advantageous in reducing stray light.

According to an embodiment of the present disclosure, an optical apparatus comprising: an optical member; and an aluminum alloy member facing the optical member, wherein a black oxide coating is formed on a surface of the aluminum alloy member facing the optical member; and a plurality of holes each having a diameter of 5 μm or more and 100 μm or less are formed in the black oxide coating.

Further features of the present disclosure will become apparent from the following description of exemplary embodiments with reference to the attached drawings.

DESCRIPTION OF THE EMBODIMENTS

Embodiment 1

Figure 1:
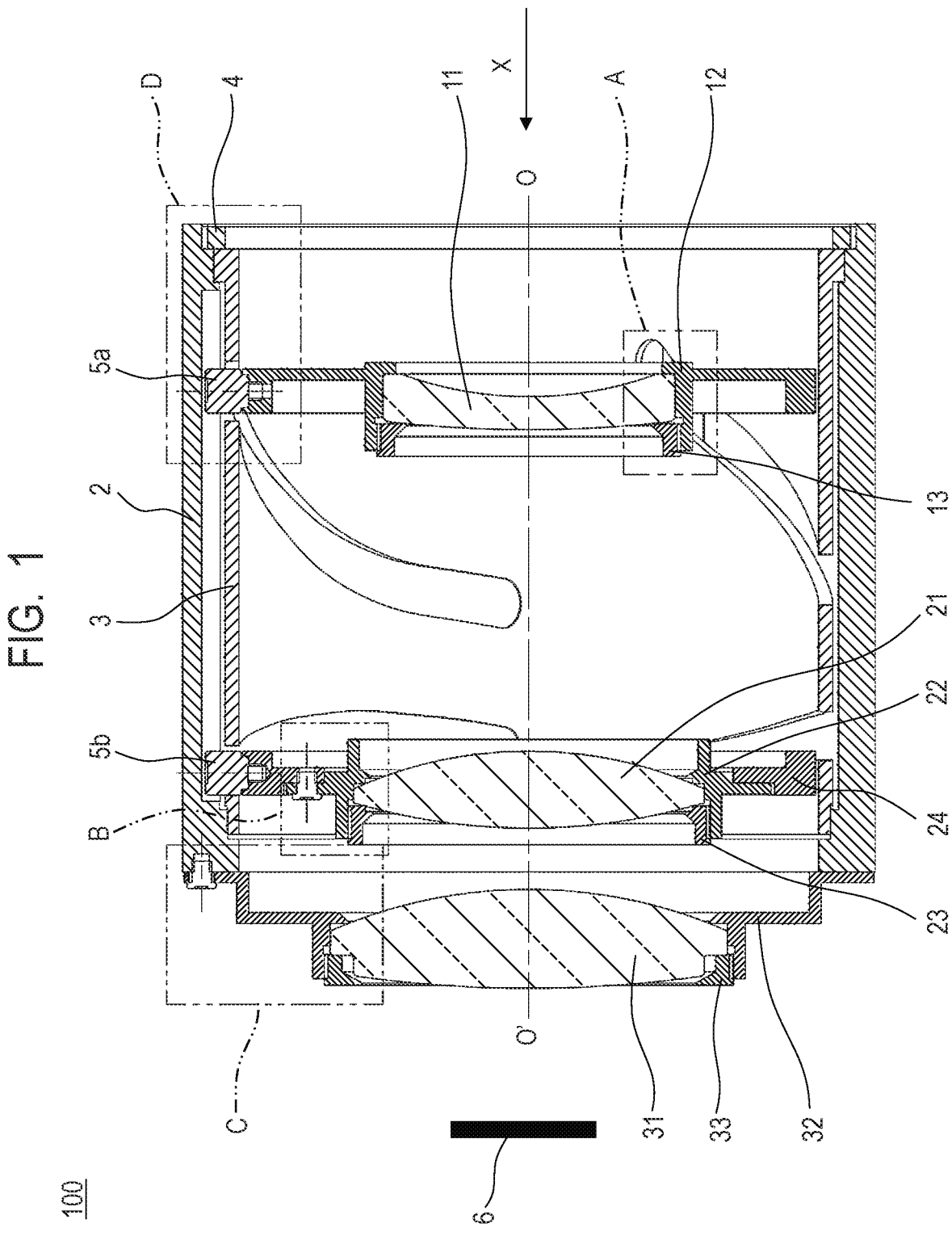
FIG. 1 is a cross-sectional view illustrating a configuration of a lens apparatus (100) to which each embodiment is applied.
Figure 2:
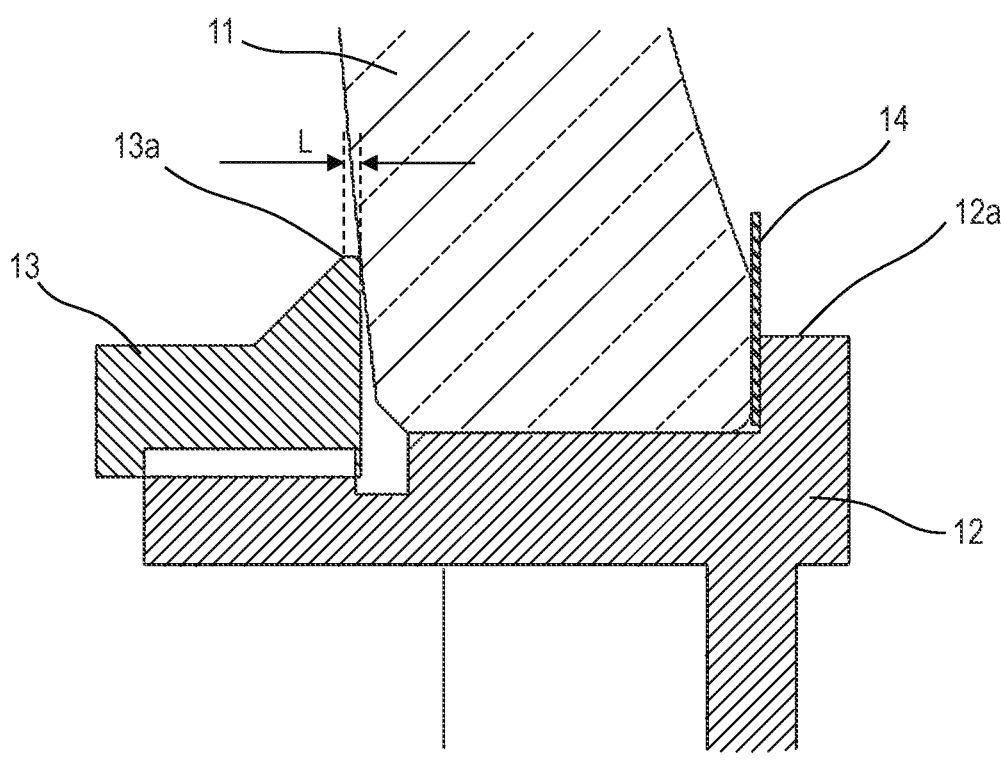
FIG. 2 is an enlarged cross-sectional view illustrating the lens holding structure of embodiment 1.

Embodiments of the present disclosure will now be described in detail in accordance with the accompanying drawings. FIGS. 1 and 2 illustrate a typical configuration of a lens apparatus 100 (optical apparatus) according to embodiment 1. FIG. 1 is a cross-sectional view illustrating a configuration of a lens apparatus 100 to which each embodiment is applied.

The lens apparatus 100 includes a fixed barrel 2, a cam barrel 3, a cam retaining ring 4 (positioning member) for positioning the cam barrel 3 so as to be rotatable around an optical axis O-O' with respect to the fixed barrel 2, a first lens 11 (optical member), a second lens 21 (optical member), and a third lens 31 (optical member). The first lens 11 is held by a first lens barrel 12 (lens barrel member) so as to be movable in the optical axis direction via a first cam follower 5a provided in the first lens barrel 12. The incident light on the lens apparatus 100 travels in the direction of the arrow X and forms an image on an imaging plane 6.

FIG. 2 is an enlarged view of a portion A in FIG. 1, and is an enlarged cross-sectional view illustrating the lens holding structure of embodiment 1. A fixed aperture 14 (aperture member) is provided between the first lens 11 and the first lens barrel 12. The first lens 11 is fitted into the first lens barrel 12, and the first lens 11 is fixed to the first lens barrel 12 by screwing a first retaining ring 13 (fixing member) into the first lens barrel 12. The fixed aperture 14 is formed of a thin plate of black metal or resin. Note that the cam barrel 3, the cam retaining ring 4, and the first retaining ring 13 are aluminum alloy members (members made of an aluminum alloy) constituting the inner diameter surface (inner surface) of the lens apparatus 100. The aluminum alloy members are disposed outside the optical member in a direction perpendicular to the optical axis O-O'.

The first lens barrel 12 and the first retaining ring 13 are made of an aluminum alloy containing aluminum, and are subjected to black alumite treatment as a black oxide coating. The black alumite treatment is performed in the following four processes except for cleaning and attachment to the electrode. First process: a degreasing process of removing oil and the like on the surface of the aluminum alloy base material with an acid, alkali, or neutral solution. Second process: an etching process of removing the oxide coating on the aluminum surface and the oil remaining in the degreasing process with an acidic or alkaline solution. Third process: an anodization process for forming an oxide coating on the surface of the member in an electrolytic cell. The fourth process: a coloring process in which the fine pores having diameters of about 10 nm formed in the anodization process are colored with black dyes or pigments.

Figure 3:
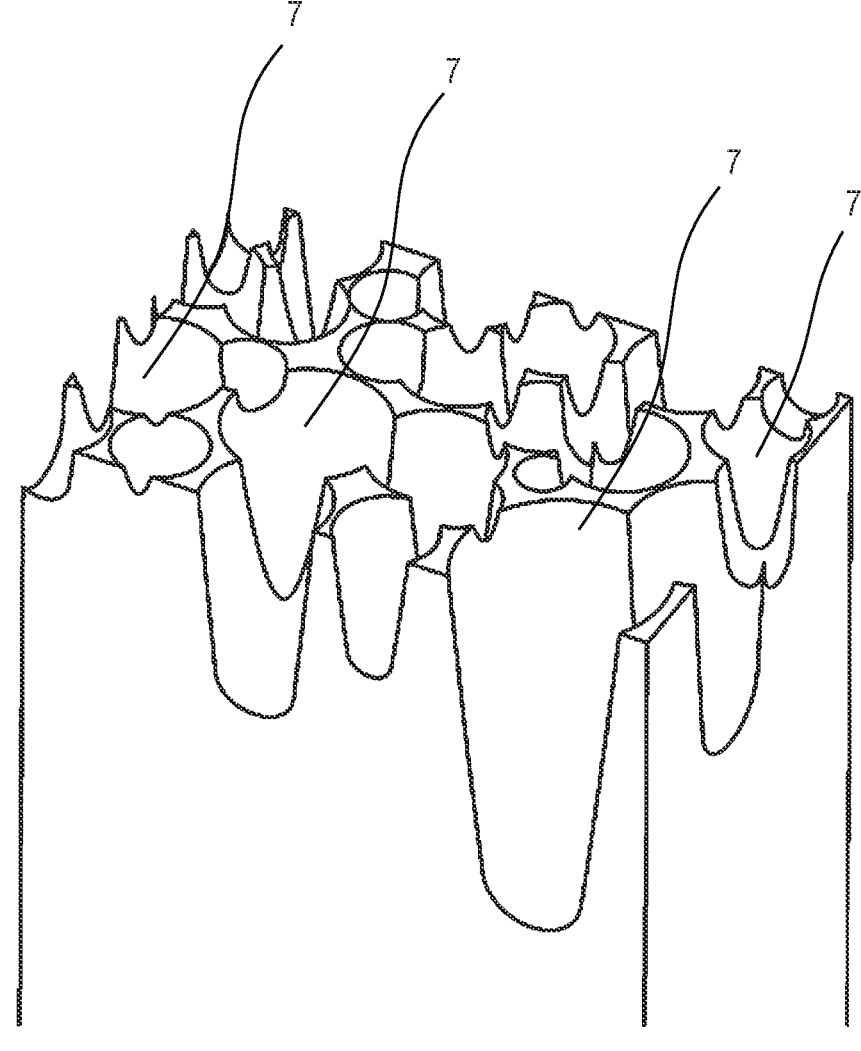
FIG. 3 is a schematic view illustrating a part of the antireflection treatment surface of embodiment 1.
Figure 4:
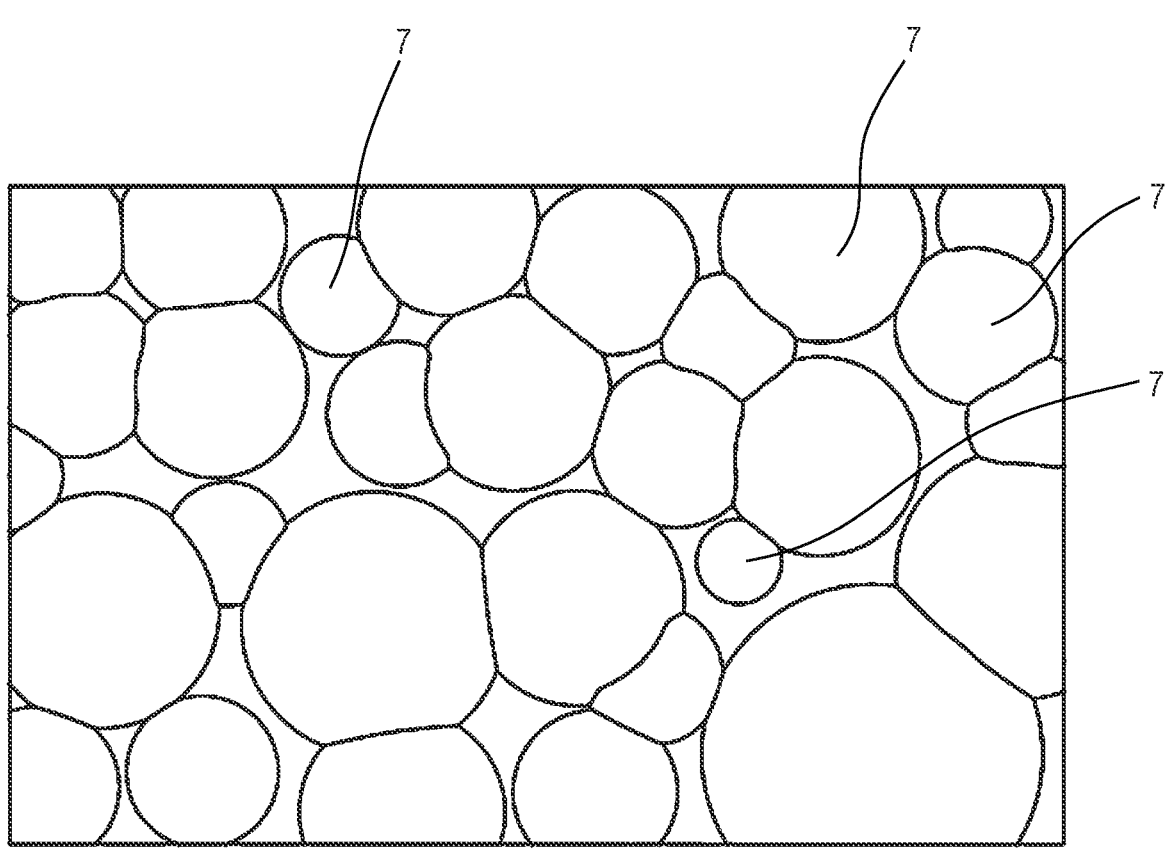
FIG. 4 is a schematic view illustrating a part of the antireflection treatment surface of embodiment 1.
Figure 5:
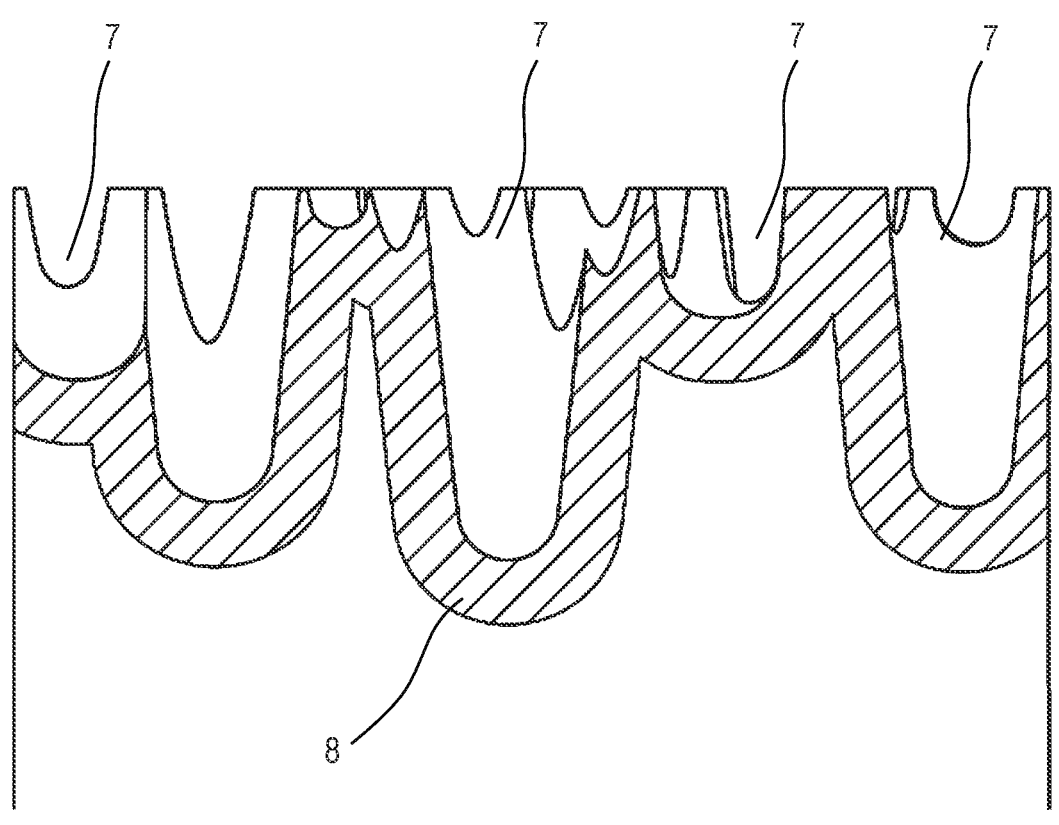
FIG. 5 is a schematic cross-sectional view illustrating a part of the antireflection treatment surface of embodiment 1.

Since the light ray reflected by an inner diameter surface 12a of the first lens barrel 12 is blocked by the fixed aperture 14, no image is formed on the imaging plane 6. On the other hand, when the light ray is reflected by an innermost diameter surface 13a (a portion closest to the optical axis) of the first retaining ring 13 which protrudes most in a direction (radial direction) perpendicular to the optical axis O-O', since there is no blocking object on the image side (imaging plane side), there is a possibility that ghost light forms an image on the imaging plane 6. In embodiment 1, in order to reduce ghost light, the reflection area is reduced by setting the width L in the optical axis direction of the innermost diameter surface 13a of the first retaining ring 13, which protrudes most in the direction orthogonal to the optical axis O-O', is set to less than or equal to 0.2 mm. Further, in order to enhance the effect of reducing reflected light that becomes ghost light, at least a part of the inner diameter surface of the first retaining ring 13 is formed with an antireflection treatment surface (treated surface). FIGS. 3 to 5 illustrate the state of the surface of the first retaining ring 13 at this time.

FIGS. 3 and 4 are a schematic view illustrating a part of the antireflection treatment surface of the first retaining ring 13 according to embodiment 1. FIG. 5 is a schematic cross-sectional view illustrating a part of the antireflection treatment surface of the first retaining ring 13 according to embodiment 1. On the innermost diameter surface 13a, which is a part of the surface of the first retaining ring 13, a plurality of holes 7 each having a size (diameter) of 5 μm to 100 μm and preferably a depth of 2 μm to 20 μm is randomly formed, as the antireflection treatment surface while overlapping each other. That is, each of the plurality of holes has a depth of 2 μm or more and 20 μm or less. The portion (region) in which the holes 7 are formed has an arithmetic mean surface roughness Ra of 1.5 μm or more and 4.5 μm or less. That is, the black oxide coating layer 8 includes a portion having a surface roughness Ra of 1.5 μm or more and 4.5 μm or less, and a plurality of holes are formed in the portion. Further, in FIG. 5, a black oxide coating layer 8 is formed from the surfaces of the holes 7 toward the inside of the member. In embodiment 1, each of the plurality of holes 7 is formed by increasing the concentration of the liquid used in the etching process or extending the treatment time as compared with the general black alumite treatment. And most of the incident lights on the innermost diameter surface 13a are absorbed by the hole 7 and the black oxide coating layer 8, and the reflectance of visible light at an incident angle of 85 degrees is 1.5% or less.

As described above, in the lens apparatus 100 according to embodiment 1, a black oxide coating layer 8 is formed on the surface of the aluminum alloy member of the lens apparatus 100 facing the optical path through the optical member. And a plurality of holes 7 having diameters of 5 μm or more and 100 μm or less is formed in the black oxide coating layer 8. In other words, a plurality of holes 7 having a diameter of 5 μm or more and 100 μm or less is formed in at least part of the surface of the aluminum alloy member on which the black oxide coating layer 8 is formed. That is, in embodiment 1, in order to reduce ghost light, the width L in the optical axis direction of the innermost diameter surface 13a (the portion closest to the optical axis O-O') of the first retaining ring 13 which protrudes most toward the optical axis O-O' in the direction orthogonal to the optical axis O-O' is set to 0.2 mm or less, and a plurality of holes 7 is formed in the innermost diameter surface 13a on which the black oxide coating layer 8 is formed. For a member to be provided with an antireflection effect, since the holes 7 are formed in the surface of the member by adjusting the etching process before the process of forming the black oxide coating layer 8, the reflectance of the surface of the member can be lowered without increasing the number of processes, and resulting in the effect of reducing ghost light. Further, since the antireflection treatment surface of embodiment 1 is formed of the holes 7, the surface shape of the member is less likely to change during handling of the member, and the antireflection effect is less likely change.

At this time, as a result of dissolution of the member on the antireflection treatment surface by etching process, a recess having a diameter of less than 5 μm or a depth of less than 2 μm may be formed on the member surface. However, since the recess is sufficiently small as compared with the hole 7 having a size of 5 μm or more and 100 μm or less, there is no influence on the stray light prevention effect.

Further, an antireflection treatment surface may be formed on the inner diameter surface 12a of the first lens barrel 12. Further, the fixed aperture 14 may be made of an aluminum alloy, and an antireflection treatment surface may be formed on the surface of the fixed aperture 14.

According to embodiment 1, it is possible to provide an optical apparatus which is advantageous in reducing stray light by reducing the reflectance of the surface of the aluminum alloy members without increasing the number of manufacturing processes of the aluminum alloy members constituting the optical apparatus.

Embodiment 2

Figure 6:
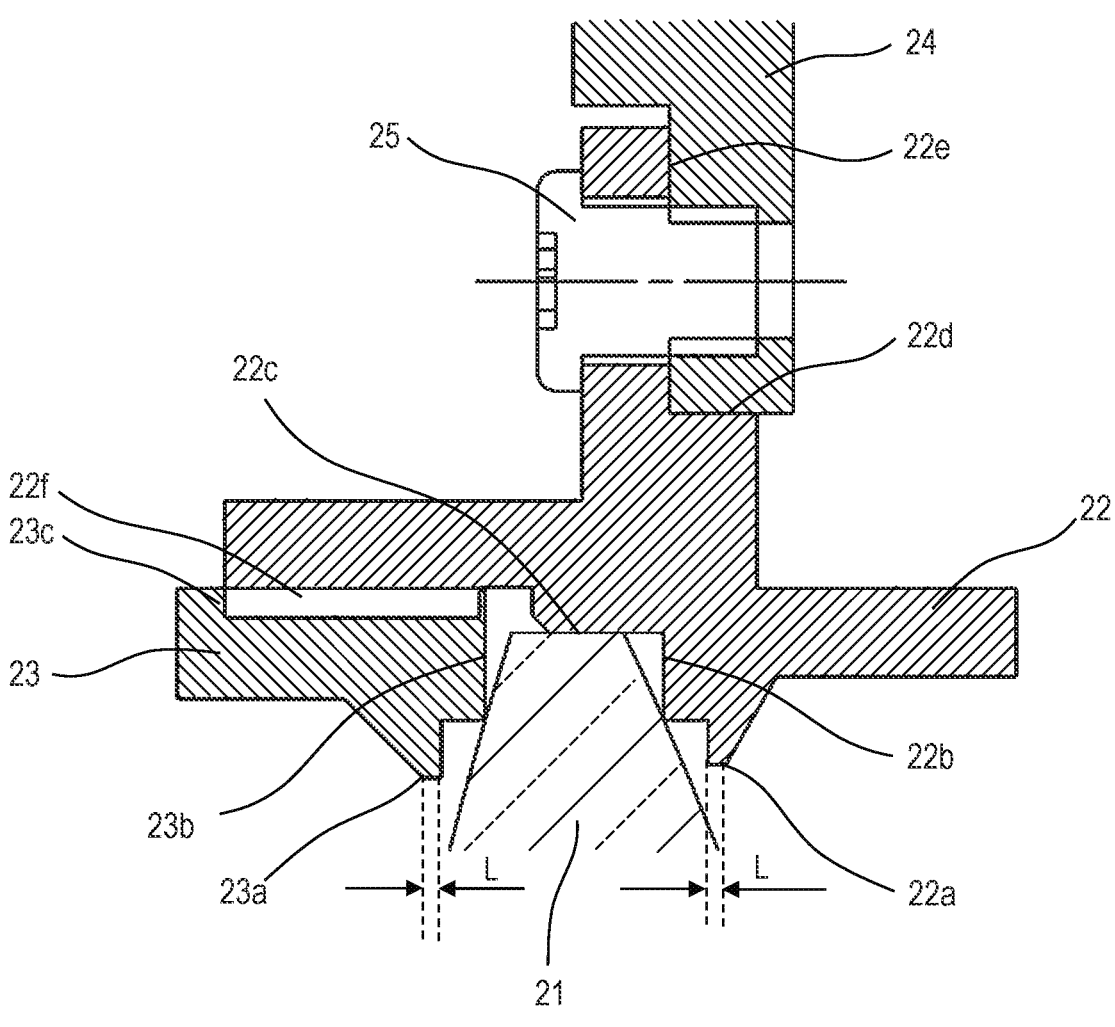
FIG. 6 is an enlarged cross-sectional view illustrating a lens holding structure of embodiment 2.
Figure 7:
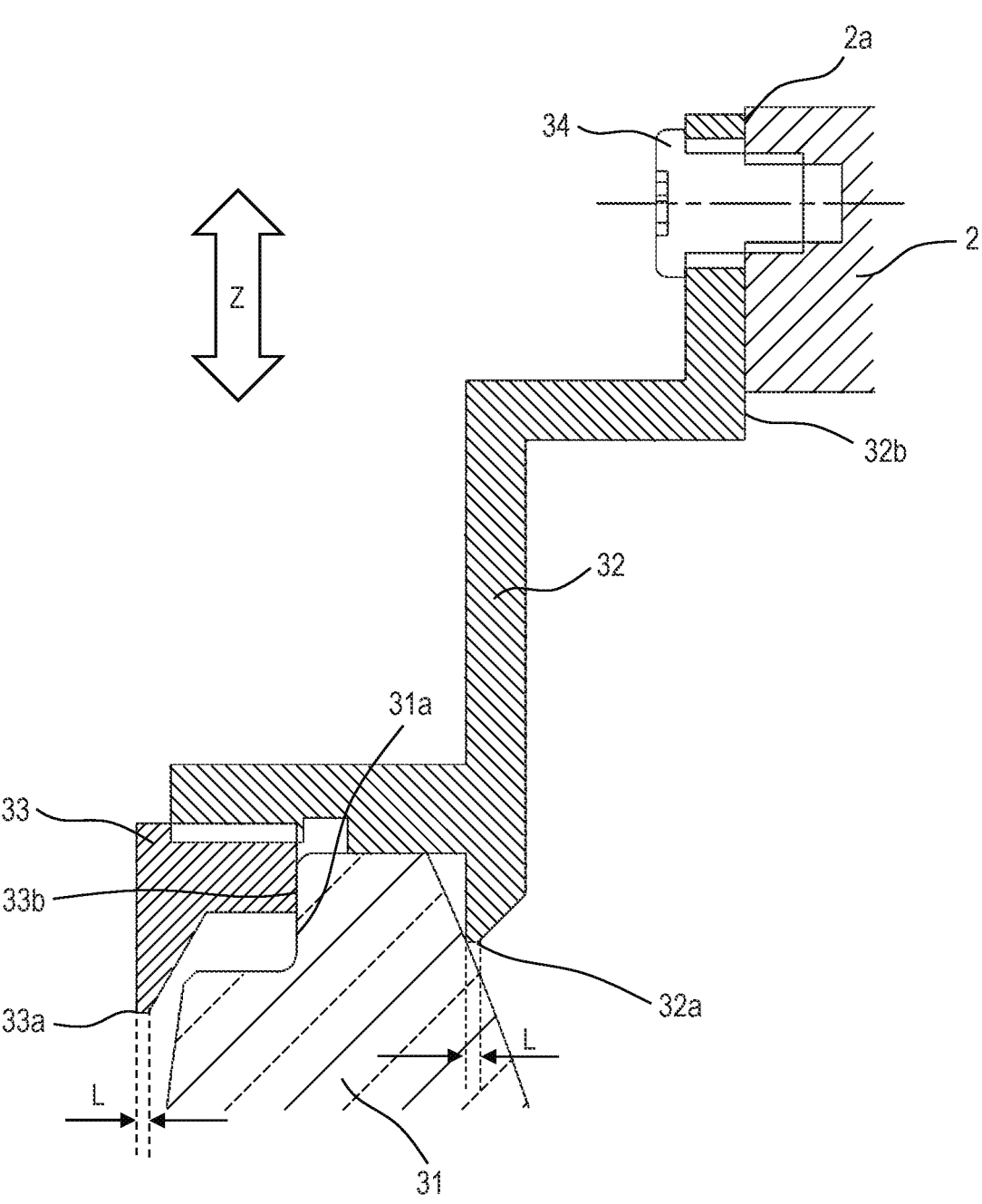
FIG. 7 is an enlarged cross-sectional view illustrating a lens holding structure of embodiment 3.

FIG. 6 illustrates a typical structure of the lens holding structure in embodiment 2. FIG. 6 is an enlarged cross-sectional view of a portion B in FIG. 1, illustrating a lens holding structure of embodiment 2. The cam structure is the same as that in embodiment 1, and therefore, the description thereof is omitted.

The second lens 21 is fitted to a second lens barrel 22 (lens barrel member), and the second lens 21 is fixed by a second retaining ring 23 (fixing member) screwed to the second lens barrel 22. The second lens barrel 22 is fixed to a movable ring 24 with a screw 25. The movable ring 24 can move in the optical axis direction by the rotation of the cam barrel 3 via a second cam follower 5b in FIG. 1. The second lens barrel 22 and the second retaining ring 23 are made of an aluminum alloy, and are subjected to black alumite treatment as a black oxide coating. The second lens barrel 22 and the second retaining ring 23 are aluminum alloy members constituting the inner diameter surface of the lens apparatus 100.

When a light ray is reflected by an innermost diameter surface 22a (portion) of the second lens barrel 22 and an innermost diameter surface 23a (portion) of the second retaining ring 23, which protrude most in the direction orthogonal to the optical axis O-O', the light ray may become ghost light that forms an image on the imaging plane 6. In embodiment 2, in order to reduce ghost light, the width L in the optical axis direction of the innermost diameter surface 22a and the innermost diameter surface 23a, which protrude most in the direction orthogonal to the optical axis O-O', are set to 0.2 mm or less, whereby the reflection areas are reduced. In order to further enhance the effect of reducing ghost light, a hole 7 having a size of 5 μm or more and 100 μm or less is formed as an antireflection treatment surface in the innermost diameter surface 22a and the innermost diameter surface 23a which are at least a part of the surfaces of the second lens barrel 22 and the second retaining ring 23. The method of forming the antireflection treatment surface is the same as that in embodiment 1, and thus the description thereof is omitted.

Although the second lens 21 is fitted into the second lens barrel 22, if the antireflection treatment is performed on the entire second lens barrel 22, the surface accuracy of a fitting inner diameter surface 22c and a lens abutting surface 22b is decreased, and the positioning accuracy of the second lens 21 may be decreased. In addition, the surface accuracy of a fitting outer diameter surface 22d at which the second lens barrel 22 is fitted to the movable ring 24 and the surface accuracy of an attachment surface 22e at which the second lens barrel 22 is attached to the movable ring 24 also decrease, and thus the fixing accuracy of the second lens barrel 22 may also decrease. Further, when the antireflection treatment is applied to the entire second retaining ring 23, the surface roughness of a lens abutting surface 23b is deteriorated, therefore, when the second retaining ring 23 is tightened while being rotated with respect to the second lens barrel 22, the second retaining ring 23 is rotated while being rubbed against the second lens 21, and the second lens 21 may be damaged.

In embodiment 2, surfaces (lens abutting surface 22b, fitting inner diameter surface 22c and lens abutting surface 23b) which come into contact with the second lens 21, which is another member, and surfaces (fitting outer diameter surface 22d, attachment surface 22e) which come into contact with the movable ring 24, which is another member, are subjected to cutting process after the etching process. By performing the cutting process, the surface roughness of the portion of the aluminum alloy member that is in contact with the other members is made smaller than the surface roughness of the portion (antireflection treatment surface) in which the hole 7 is formed. That is, the black oxide coating layers 8 of the second lens barrel 22 and the second retaining ring 23 have a first portion (lens abutting surface 22b, fitting inner diameter surface 22c and lens abutting surface 23b) in contact with the second lens 21, and a second portion (innermost diameter surface 23a of the second retaining ring 23) having a surface roughness greater than the first portion, and the plurality of holes 7 is formed in the second portion. In this way, it becomes possible to prevent the deterioration of the positioning accuracy of the second lens 21, the deterioration of the fixing accuracy of the second lens barrel 22, and the damage of the second lens 21. A surface of the member that requires blackness or hardness may be subjected to cutting process before the anodization process, and a surface of the member that does not require color or hardness may be subjected to cutting process after the black alumite process, may be performed. Instead of cutting process, masking may be performed during etching process.

In this way, by cutting process the surface in contact with another member after the etching process, it is possible to prevent a decrease in the positioning accuracy of the second lens 21, a decrease in the fixing accuracy of the second lens barrel 22, and damages to the second lens 21. Further, a screw portion 22f of the second lens barrel 22 is processed in the same process as the lens abutting surface 22b and the fitting inner diameter surface 22c, and a screw portion 23c of the second retaining ring 23 is processed in the same process as the lens abutting surface 23b, whereby the eccentric accuracy and the angle accuracy between the surfaces of the second lens barrel 22 and the second retaining ring 23 are improved. Thus, the fixing accuracy of the second lens 21 can be further improved.

According to embodiment 2, it is possible to provide an optical apparatus which is advantageous in reducing stray light by reducing the reflectance of the surface of the aluminum alloy members without increasing the number of manufacturing processes of the aluminum alloy members constituting the optical apparatus. Further, it is possible to prevent a decrease in the positioning accuracy of the optical element, a decrease in the fixing accuracy of the lens barrel, and damages to the optical element.

Embodiment 3

The third lens 31 is fitted to a third lens barrel 32 (lens barrel member), and the third lens 31 is fixed by a third retaining ring 33 (fixing member) screwed to the third lens barrel 32. A lens abutting surface 33b of the third retaining ring 33 is in contact with a peripheral portion 31a of the third lens 31 provided separately from the surface of the third lens 31 through which the light ray passes. The third lens barrel 32 is fixed to an end surface 2a of the fixed barrel 2 with a screw 34. The third lens barrel 32 and the third retaining ring 33 are made of an aluminum alloy, and are subjected to black alumite treatment as a black oxide coating. The third lens barrel 32 and the third retaining ring 33 are aluminum alloy members constituting the inner diameter surface of the lens apparatus 100.

When a light ray is reflected by the innermost diameter surface 32a (portion) of the third lens barrel 32 and an innermost diameter surface 33a (portion) of the third retaining ring 33, which protrude most in the direction orthogonal to the optical axis O-O', the light ray may become ghost light that forms an image on the imaging plane 6. In embodiment 3, in order to reduce ghost light, the width L in the optical axis direction of the innermost diameter surface 32a and the innermost diameter surface 33a which protrude most in the direction orthogonal to the optical axis O-O', are set to 0.2 mm or less, whereby the reflection areas are reduced. In order to further enhance the effect of reducing ghost light, a hole 7 having a size of 5 μm or more and 100 μm or less is formed as an antireflection treatment surface in the innermost diameter surface 32a and the innermost diameter surface 33a which are at least a part of the surfaces of the third lens barrel 32 and the third retaining ring 33. The method of forming the antireflection treatment surface is the same as that in embodiment 1, and thus the description thereof is omitted.

In embodiment 3, in a state where the screw 34 is loosened, the third lens 31 is moved in the direction of the arrow Z with respect to the optical axis O-O', so that a lens barrel fixing surface 32b slides on the end surface 2a of the fixed barrel 2 which is another member, whereby performing the decentering adjustment. If the antireflection treatment is applied to the entire third lens barrel 32, the sliding between the lens barrel fixing surface 32b and the end surface 2a is deteriorated, and the workability of the eccentricity adjustment may be deteriorated.

In embodiment 3, the lens barrel fixing surface 32b is subjected to cutting process after the etching process. By performing the cutting process, the surface roughness of the portion of the aluminum alloy member that is in contact with another member is made smaller than the surface roughness of the portion (the antireflection treatment surface) in which the hole 7 is formed. In this way, the sliding between the lens barrel fixing surface 32b and the end surface 2a is improved, and it is possible to prevent a decrease in the workability of the eccentricity adjustment. A surface of the member that requires blackness or hardness may be subjected to cutting process before the anodization process, and a surface of the member that does not require color or hardness may be subjected to cutting process after black alumite process, may be performed. Instead of cutting process, masking may be performed during etching process.

Even if the whole of the third retaining ring 33 is subjected to the antireflection treatment, since the lens abutting surface 33*b* of the third retaining ring 33 abuts against the peripheral portion 31*a* of the third lens 31, even if the third lens 31 is scratched, it is possible to reduce the influence on the optical performance.

According to embodiment 3, it is possible to provide an optical apparatus which is advantageous in reducing stray light by reducing the reflectance of the surface of the aluminum alloy members without increasing the number of manufacturing processes of the aluminum alloy members constituting the optical apparatus. Further, it is possible to prevent a decrease in the workability of the eccentricity adjustment.

Embodiment 4

Figure 8:
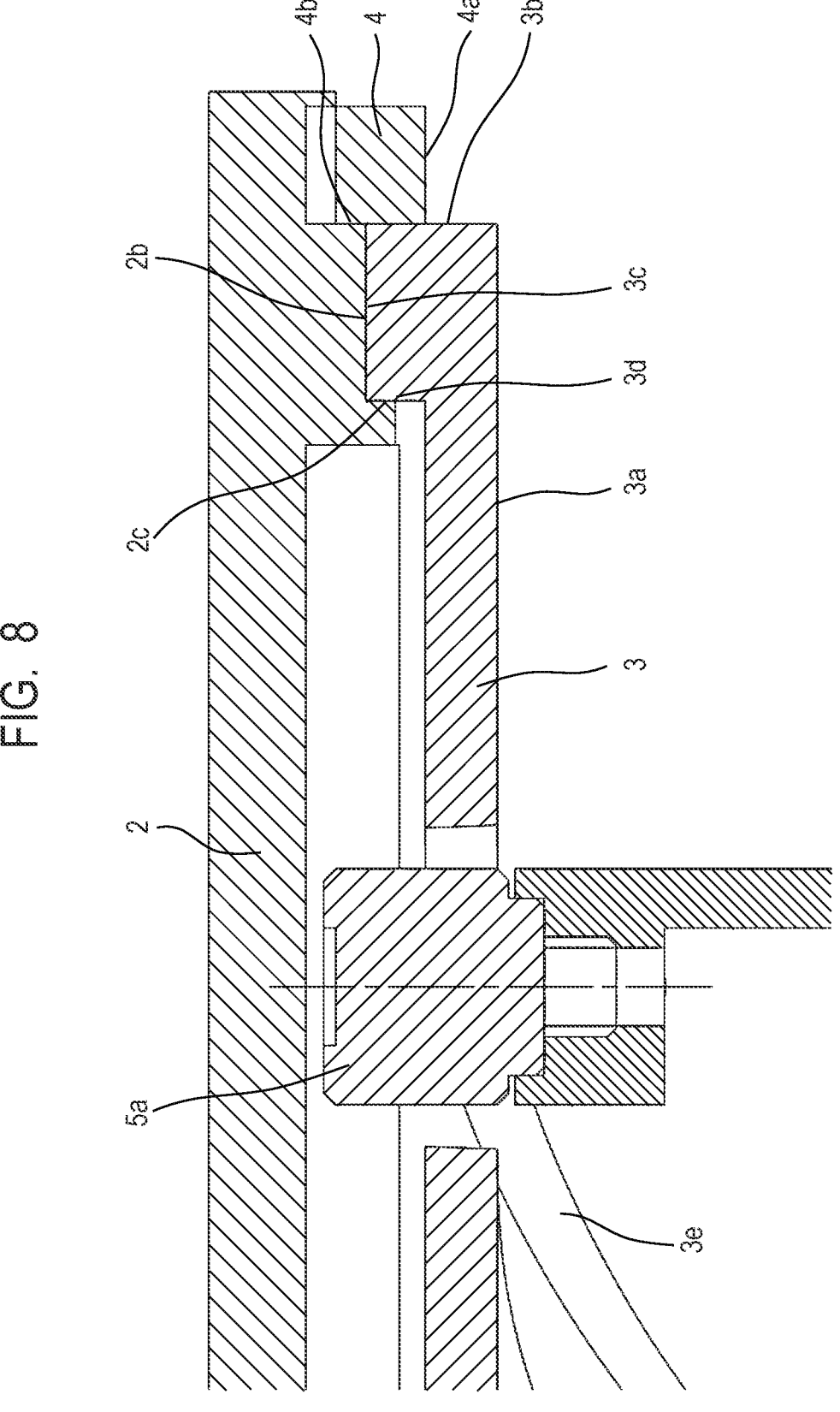
FIG. 8 is an enlarged cross-sectional view illustrating a lens holding structure of embodiment 4.

FIG. 8 illustrates a typical structure of the lens holding structure in embodiment 4. FIG. 8 is an enlarged cross-sectional view of a portion D in FIG. 1, illustrating a lens holding structure of embodiment 4. A description of configurations common to embodiment 1 will be omitted.

The cam barrel 3 and the cam retaining ring 4 are made of an aluminum alloy, and are subjected to black alumite treatment as a black oxide coating.

When a light ray is reflected by an inner diameter surface 3*a* of the cam barrel 3 and an inner diameter surface 4*a* of the cam retaining ring 4, the light ray may become ghost light that forms an image on the imaging plane 6. In order to reduce ghost light, an antireflection treatment surface is formed on the inner diameter surface 3*a* and the inner diameter surface 4*a* which are at least a part of surfaces of the cam barrel 3 and the cam retaining ring 4. The method of forming the antireflection treatment surface is the same as that in embodiment 1, and thus the description thereof is omitted.

The cam barrel 3 slides on a cam pressing surface 4*b* of the cam retaining ring 4 at a sliding surface 3*b*, and slides on a sliding surface 2*b* and a sliding surface 2*c* of the fixed barrel 2 at a sliding surface 3*c* and a sliding surface 3*d*, respectively. Further, the first cam follower 5*a* slides with respect to a cam groove 3*e* provided in the cam barrel 3. If the surfaces (sliding surface 3*b*, sliding surface 3*c*, sliding surface 3*d*, cam pressing surface 4*b*, and cam groove 3*e*) that slide on the fixed barrel 2, the cam retaining ring 4 (another member), and the first cam follower 5*a* (another member) are subjected to the antireflection treatment, the sliding of the surfaces deteriorates, and there is a possibility that wear of the members occurs.

In embodiment 4, the sliding surface 3*b*, the sliding surface 3*c*, the sliding surface 3*d*, cam pressing surface 4*b*, the cam groove 3*e*, are subjected to cutting process after the etching process. By performing the cutting process, the surface roughness of the portion of the aluminum alloy member that is in contact with the other members is made smaller than the surface roughness of the portion (antireflection treatment surface) in which the hole 7 is formed. That is, the black oxide coating layers 8 of the cam barrel 3 has a first portion (sliding surface 3*b*, sliding surface 3*c*, sliding surface 3*d* and cam groove 3*e*) where slides with respect to the fixed barrel 2 or cam retaining ring 4, and a second portion (inner diameter surface 3*a* and inner diameter surface 4*a*) having a surface roughness greater than the first portion, and the plurality of holes 7 is formed in the second portion. In this way, it becomes possible to reduce the wears between the sliding surfaces and other members. A surface of the member that requires blackness or hardness may be subjected to cutting before the anodization process, and a surface of a member that does not require color or hardness may be subjected to cutting process after the black alumite process, may be performed. Instead of cutting process, masking may be performed during etching process.

According to embodiment 4, it is possible to provide an optical apparatus which is advantageous in reducing stray light by reducing the reflectance of the surface of the aluminum alloy member without increasing the number of manufacturing processes of the aluminum alloy member constituting the optical apparatus. Further, it is possible to reduce wears of the sliding members.

Application Example 1

Figure 9:
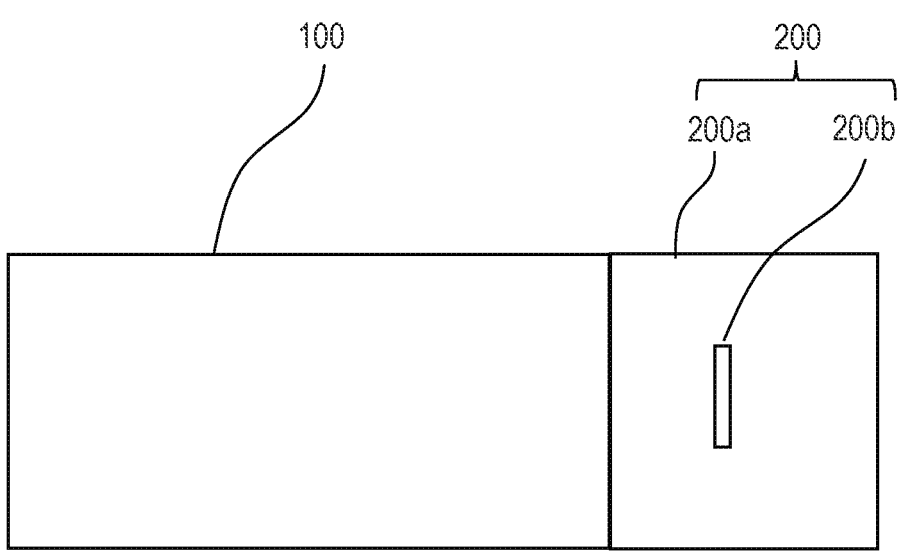
FIG. 9 is a schematic diagram illustrating a configuration example of an image pickup apparatus.

Although the lens apparatus 100 has been described in each of the above-described embodiments, the lens apparatus 100 can be applied to an image pickup apparatus described below. FIG. 9 is a schematic diagram illustrating a configuration example of a camera apparatus 200 (image pickup apparatus) using the lens apparatus 100 (interchangeable lens for a camera) to which the present disclosure is applied. The image pickup apparatus includes the lens apparatus 100 and the camera apparatus 200 constituted by a camera body 200*a* having an image pickup element 200*b* for capturing an image formed by the lens apparatus 100. The image pickup apparatus has a configuration in which the lens apparatus 100 is detachably mounted on the camera body 200*a* of the camera apparatus 200, but the camera body 200*a* and the lens apparatus 100 may be integrally configured.

Application Example 2

Although the lens apparatus 100 has been described in each of the above embodiments, the lens apparatus 100 can also be applied to a projection apparatus. The projection apparatus includes a lens apparatus 100 and a light source that emits light projected by the lens apparatus 100 (a light source, not illustrated disposed on the 0 side in FIG. 1). Then, the light ray from the light source is projected onto the screen instead of the imaging plane 6 via the lens apparatus 100 from the X direction. It is needless to say that the effect of the present disclosure can also be obtained in the projection apparatus. Further, since the inside of the projection apparatus is heated to a high temperature, it is possible to obtain effects such as a reduction in cost and an improvement in durability by forming the antireflection treatment surface without coating.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-129616, filed Aug. 16, 2022, which is hereby incorporated by reference herein in its entirety.

What is claimed is:

1. An optical apparatus comprising:
an optical member; and
an aluminum alloy member facing provided on a member that holds the optical member,
wherein the aluminum alloy member has a surface including a black oxide coating formed thereon, and wherein the aluminum alloy member includes a plurality of holes each having a diameter of 5 μm or more and 100 μm or less formed in the black oxide coating.

2. The optical apparatus according to claim 1, wherein each of the plurality of holes has a depth of 2 μm or more and 20 μm or less.

3. The optical apparatus according to claim 1, wherein the black oxide coating includes a portion having a Ra surface roughness of not less than 1.5 μm and not more than 4.5 μm, and the plurality of holes are formed in the portion.

4. The optical apparatus according to claim 1, wherein each of the plurality of holes is formed by etching.

5. The optical apparatus according to claim 1, wherein the plurality of holes is formed in a portion of the black oxide coating closest to an optical axis, and wherein a width of the portions in an optical axis direction is 0.2 mm or less.

6. The optical apparatus according to claim 1, wherein the black oxide coating includes a first portion in contact with the optical member, and a second portion having a surface roughness larger than that of the first portion, and the plurality of holes is formed in the second portion.

7. The optical apparatus according to claim 1,
   wherein the aluminum alloy member is attached to a fixing member, and
   wherein the black oxide coating includes a first portion which slides with respect to the fixing member, and a second portion having a surface roughness larger than that of the first portion, and the plurality of holes is formed in the second portion.

8. The optical apparatus according to claim 1, wherein the aluminum alloy member is a lens barrel member that holds the optical member.

9. The optical apparatus according to claim 1, wherein the aluminum alloy member is a cam barrel and a positioning member for positioning the cam barrel.

10. The optical apparatus according to claim 1, wherein the aluminum alloy member is an aperture member.

11. The optical apparatus according to claim 1, wherein at least a part of light reflected by the optical member is absorbed within the plurality of holes.

12. An image pickup apparatus comprising:
   an optical apparatus; and
   an image pickup element configured to capture an image formed by the optical apparatus, the optical apparatus comprising:
      an optical member; and
      an aluminum alloy member provided on a member that holds the optical member,
   wherein the aluminum alloy member has a surface including a black oxide coating formed thereon, and
   wherein the aluminum alloy member includes a plurality of holes each having a diameter of 5 μm or more and 100 μm or less formed in the black oxide coating.

13. A projection apparatus comprising:
   an optical apparatus; and
   a light source that emits light to be projected by the optical apparatus, the optical apparatus comprising:
      an optical member; and
      an aluminum alloy member provided on a member that holds the optical member,
   wherein the aluminum alloy member has a surface including a black oxide coating formed thereon, and
   wherein the aluminum alloy member includes a plurality of holes each having a diameter of 5 μm or more and 100 μm or less formed in the black oxide coating.

* * * * *